United States Patent
Knoll

[15] 3,666,673
[45] May 30, 1972

[54] METHOD OF DISPOSING OF RADIOACTIVE ORGANIC WASTE SOLUTIONS

[72] Inventor: Kenneth C. Knoll, Richland, Wash.

[73] Assignee: The United States of America as represented by the United States Atomic Energy Commission

[22] Filed: Dec. 24, 1969

[21] Appl. No.: 888,048

[52] U.S. Cl. .......................... 252/301.1 W, 23/326, 23/337
[51] Int. Cl. ....................................................... C09k 3/00
[58] Field of Search ................ 252/301.1, 301.1 WD, 455 Z; 23/326, 337; 260/702

[56] References Cited

UNITED STATES PATENTS

| 3,483,128 | 12/1969 | Rodi et al. | 252/301.1 W |
| 3,345,135 | 10/1967 | Kerr et al. | 252/455 Z |
| 2,855,271 | 10/1958 | Libby | 23/326 |
| 3,243,380 | 3/1966 | Conn | 252/301.1 |
| 3,483,128 | 12/1969 | Rodi et al. | 252/301.1 |
| 2,901,314 | 8/1959 | Vavalides | 23/337 |
| 3,429,671 | 2/1969 | Ellison et al. | 23/326 X |

FOREIGN PATENTS OR APPLICATIONS

| 879,580 | 10/1961 | Great Britain | 23/236 |

*Primary Examiner*—Carl D. Quarforth
*Assistant Examiner*—R. L. Tate
*Attorney*—Roland A. Anderson

[57] ABSTRACT

Radioactive organic waste solutions may be disposed of and the radioactive material contained therein may be concentrated by passing the wastes as a liquid or vapor into a suitable preheated oxidation catalyst in the presence of air and collecting the radioactive residue from the oxidized organic wastes.

1 Claim, No Drawings

METHOD OF DISPOSING OF RADIOACTIVE ORGANIC WASTE SOLUTIONS

CONTRACTUAL ORIGIN OF THE INVENTION

The invention described herein was made in the course of, or under, a contract with the United States Atomic Energy Commission.

BACKGROUND OF THE INVENTION

This invention relates to a method for the disposal of radioactive organic waste solutions. More specifically, this invention relates to a method of concentrating radioactive organic waste solutions by catalytic oxidation of the organic compound.

The reprocessing of irradiated nuclear reactor fuels requires large volumes of organic extractants and solvents, such as tributyl phosphate, di-(2-ethylhexyl) phosphoric acid and normal paraffin hydrocarbon. These organic compounds in time become radioactively contaminated, are no longer useful, and must be disposed of. Disposal of radioactively contaminated liquid organic wastes poses a difficult problem for nuclear separations plants. The wastes may not only be contaminated with radionuclides but also the ability to extract certain metallic ions from other ion exchangers makes their disposal to the environment potentially hazardous. At the present time, these organics are generally stored in underground tanks or disposed of to the ground through cribs or wells.

The use of underground storage is obviously very expensive because of the extensive facilities which are necessary to cope with the large volumes of materials which must be stored.

Soil disposal of these organics must be carefully controlled, because while the presence of organics in the soil does not inhibit the removal of radionuclides from subsequent aqueous wastes by ion exchange, the organics may contain ions which will not be removed by exchange in the soil. Also, some of the organic wastes may remove previously deposited radionuclides as they migrate through the soil. The radionuclides may be carried by the organics and may eventually reach ground water.

An obvious disposal method for the organic wastes is open burning. The problems here is the polluting of the atmosphere with the resultant off-gases, but more hazardous is the dispersal of radioactivity in the gases released by burning. Results have shown that large amounts of incomplete combustion products will result, although the bulk of the radioactivity will remain in the container. When the fuel is atomized and burned in an air stream, not all of the radioactivity appears to be recoverable, which indicates that a portion of the radioactivity passes into the atmosphere, an intolerable situation.

SUMMARY OF THE INVENTION

I have invented a method for the disposal of radioactive organic waste solutions and for the concentration of the radioactive materials contained therein which eliminates many of the problems enumerated above which are associated with prior art methods of waste disposition. By the process of my invention, the radioactive organic waste materials are passed, either as a liquid or as a vapor, into a suitable heated oxidation catalyst in the presence of a stream of air in a closed system. The catalyst causes oxidation of the organic compounds to CO and $CO_2$ which are swept from the catalyst as off-gases in the air stream, either for recycling or for venting to the atmosphere, leaving only the radioactive residue in the system from which it may be readily removed for long-term storage.

It is therefore one object of this invention to provide a method of disposing of radioactive organic waste solutions which is relatively inexpensive.

It is another object of this invention to provide a method for concentrating the radioactive material contained in radioactive organic waste solutions so that the bulk of the waste solution may be disposed of by a method which is safe and which will result in no pollution, either to the ground or to the air.

Finally, it is an object of this invention to provide a method of disposing of radioactive organic waste solutions which will require only a fraction of the storage space required by present methods of disposition.

DESCRIPTION OF THE PREFERRED EMBODIMENT

These and other objects may be attained by oxidizing the radioactive organic solutions with a catalyst in a closed system so that the radioactive material remains in the system and the oxidation products may, after scrubbing to remove any possible radioactive contaminants, be vented to the atmosphere. This oxidation may be accomplished by passing the radioactive organic solution, as a liquid or as a vapor, through a suitable porous catalyst bed which has been preheated to a temperature sufficient to initiate oxidation of the organic solution. At the same time, a stream of air is passed through the catalyst to aid in oxidation of the organic solution and to carry off the gases, such as $CO_2$ and CO, produced as a result of the oxidation. This air then passes through a series of condensers, traps and filters where any entrained radioactive material is removed from the gases. After the gases have been cleaned, they may be vented to the atmosphere with no fear of pollution. This method results in almost complete destruction of the organic waste solutions so that only the concentrated radioactive material need be stored, resulting in substantial monetary savings due to the reduced storage facilities necessary for the radioactive waste.

A number of catalysts have been found to be operable in the process of this invention including a number of commercially made preparations. However, some problems have been noted with the commercial catalysts in that the binders are generally somewhat soft and the pellets have a tendency to powder. The best results are achieved with porous catalysts prepared from synthetic zeolites of the molecular sieve type. One such zeolite has the following general formula expressed in terms of mol fractions of oxides: $0.9 \pm 0.2\ M_2O: Al_2O_3: 2.5 + 0.5\ SiO_2: 0$ to $8\ H_2O$, where "M" represents a cation, for example hydrogen or a metal, and "$n$" is the valence. This compound is known as zeolite X and is described and claimed in U.S. Pat. No. 2,882,244, issued Apr. 14, 1959 to R. M. Milton. Zeolite X is available commercially under the trade name of Linde Molecular Sieve 13X. Another satisfactory catalyst base is Type A Molecular Sieve which is very similar in structure to the 13X and is commercially available.

The molecular sieve must be in a metal form, which metal is known to be an oxidation catalyst for organic compounds. Examples of these metals are nickel, copper and sodium. These catalysts are made by contacting the base material with about a 5 N solution of nickel, sodium or copper nitrate until the sieve is saturated with metal ion. This may be accomplished by either passing the solution through the sieve material until saturation occurs or by forming a slurry with the solution and sieve material and permitting it to sit overnight. The next morning fresh solution is mixed with the sieve material which is then permitted to settle. The metal-saturated sieve is then washed with distilled water until no more metal ion is washed off. The material is then oven-dried at 200° C. The physical characteristics of these porous catalysts are very good, with little tendency to break or powder. All the catalysts described herein perform equally well in oxidizing the organic solutions.

The catalytic oxidation method may be used in two ways. The organic solution is first heated in a vaporizer to a temperature sufficient for vaporization to occur. The organic vapors are then swept by the air stream through a preheated porous catalyst where vaporized catalytic oxidation of the organic compounds occurs. In this method, most of the radioactive material will concentrate on the vaporizer, which may be nothing more than a heated metal plate. The radioactive material may then be washed from this vaporizer for storage or the entire vaporizer with the radioactive material on it may be sent to storage. Any radioactive material carried off by the vaporized solution will be concentrated in the catalystic bed from which it can be removed for storage.

The liquid fuel may also be fed directly into the preheated catalyst bed through which an air stream is passed. The oxidation reaction takes place at the catalytic bed and the off-gases are swept out with the air stream, either for recycle or disposal. The radioactive material then concentrates in the catalytic bed, which when no longer effective may be readily removed and easily stored, occupying little space.

The choice of method is dependent upon the fuel to be oxidized. It was found that the alkyl phosphates, such as tributyl phosphate, when vaporized leave a residue of phosphoric acid. If this fuel is fed directly to the catalyst bed, this residue will cement the catalyst particles together and reduce their efficiency. Therefore, such fuels should first be vaporized in a chamber which does not contain a catalyst, and the vapor fed into the catalyst for oxidation. Fuels which vaporize completely can be fed directly into the catalyst bed for oxidation.

A number of organic extractants and solvents are oxidizable by the process of this invention, such as dodecane, NPH which is a commercial mixture of normal paraffin hydrocarbons containing from 10 to 14 carbon atoms, water-saturated solution of NPH, a solution of NPH containing 30 vol. percent tributyl phosphate, and a water-saturated solution of 0.4 M di-(2-ethylhexyl) phosphoric acid and 0.2 M tributyl phosphate in NPH. Also successfully oxidized was a 30 vol. percent mixture of dibutylbutyl phosphonate in carbon tetrachloride.

The gases which are the oxidation products of this reaction are $CO_2$, $CO$ and water vapor. Some water vapor will also be present in the off-gases due to any water which may be present in the organic solutions. The water vapor is removed and the off-gases may be scrubbed by any suitable method which will remove all entrained radioactive particles or material before venting the gases to the atmosphere.

The catalyst bed must be preheated to a temperature sufficient to initiate the oxidation reaction before passing the fuel either as a liquid or as a vapor onto the bed. Although this temperature varied somewhat depending upon the catalyst and the fuel used, in general a temperature of from 200° to 250° C. was sufficient to initiate the oxidation reaction.

The temperature to which the reaction will rise is dependent upon the rate of air flow through the bed and to a lesser extent upon the rate of fuel flow and the particular catalyst being used. In general the temperature will be from about 400° to 650° C. Temperatures of above 650° C. should be avoided to prevent destruction of the catalyst bed. Using a fuel of 30 vol. percent TBP in NPH at a flow rate of 0.16 ml/min and an air flow rate of 520 ml/min through a nickel-based commercial catalyst resulted in temperatures generally ranging from 450° C. to a high of about 525° C. Increasing the fuel flow rate to 0.18 ml/min through a copper-based commercial catalyst raised the temperature range to from about 575° to 610° C.

A study of the effect of fuel flow rates was made using a sodium-based 13X molecular sieve with an air flow rate of 1,000 ml/min and using TBP in NPH as a fuel. At a fuel flow rate of 0.34 ml/min, the temperature remained almost steady at 600° C. When the fuel flow was halved to 0.15 ml/min, a temperature of about 600° C. was achieved in about 10 minutes, but the temperature gradually dropped off until after 100 minutes the bed temperature was down to about 475° C.

The following examples are given as illustrative of this invention and are not to be construed as limiting the scope of the invention.

EXAMPLE I 9.9 ml of dodecane containing 6.4 grams of carbon was oxidized by passing through a copper-based 13X molecular sieve. Incoming air was passed through NaOH to remove $CO_2$ present. The off-gases were passed through NaOH scrubbing solution. Titration of the scrubbing solution showed 21.01 grams of $CO_2$ had been produced containing 6.4 grams of carbon, giving a recovery of 90 percent.

EXAMPLE II

A sample of 30 percent TBP in NPH was spiked with $Cs^{137}$ and vaporized before passing through a nickel-based commercial catalyst. Off-gases were passed through a condenser, a trap, a filter and another trap. After vaporizing 20.4 ml of the fuel, the equipment was disassembled and checked for gamma activity. It was determined that 85 percent of the radioactivity that had been in the vaporized fuel remained in the vaporizer. No activity was found in the filters or any other parts of the system, which would indicate that no activity was present in the off-gases.

EXAMPLE III

A copper-based 13X molecular sieve catalyst weighing 13 grams was heated to 215° C. A water-saturated solution of NPH was fed directly into the heated catalyst. Within 5 minutes the catalyst temperature was up to 305° C. and by 20 minutes the temperature was up to 450° C. where it remained for the remainder of the run, which lasted for a total of 3 hours during which 16.6 ml of fuel was oxidized.

EXAMPLE IV

A fuel consisting of 30 percent TBP in NPH was vaporized at 220° C. and the vapor carried by a flow of air into 5 grams of sodium-based 13X molecular sieve catalyst which had been preheated. After 2 minutes the catalyst temperature was 515° C. and in 10 minutes it was 580° C., at which time the catalyst heater was shut off. The temperature then dropped slowly to 355° C. when fuel flow was stopped. In the 3.75 hour run 32.8 ml of fuel was oxidized using a total of 11 liters of air.

It will be understood that the invention is not to be limited to the details given herein but that it may be modified within the scope of the appended claims.

What is claimed is:

1. A method of disposing of a radioactive organic waste solution consisting of 30 percent tributyl phosphate in a mixture of normal paraffin hydrocarbons containing from 10 to 14 carbon atoms comprising heating a nickel-based zeolite oxidation catalyst, passing air through said heated catalyst, vaporizing said organic waste solution, and passing the resulting vapors together with air through said oxidation catalyst whereby said organic waste solution oxidizes to a gas which is carried off with the air and the radioactivity remains in the vaporizer and oxidation catalyst.

* * * * *